United States Patent Office 3,649,667
Patented Mar. 14, 1972

3,649,667
ARYL POLYESTERS OF 3,5-DIALKYL-4-HYDROXY-PHENYL-ALKANOIC ACIDS
John Song, Bound Brook, Joseph Adrian Hoffman, Bridgewater Township, Somerset County, and Peter Vincent Susi, Middlesex, N.J., assignors to American Cyanamid Company, Stamford, Conn.
No Drawing. Continuation-in-part of application Ser. No. 706,607, Feb. 19, 1968. This application June 24, 1970, Ser. No. 49,535
Int. Cl. C07c 69/76
U.S. Cl. 260—473 S                                        4 Claims

ABSTRACT OF THE DISCLOSURE

Organic materials normally subject to oxidative deterioration, particularly polypropylene, are stabilized by the incorporation therein of novel hindered polyphenols which are substituted-benzyl esters of β-(substituted hydroxyphenyl)propionic acids. The antioxidants are non-discoloring and exhibit a low degree of extractability from the substrate in the presence of aromatic organic solvents.

---

This invention relates to the stabilization of organic material normally subject to oxidative deterioration. More particularly, it relates to the stabilization of polypropylene with a new class of compounds which are hindered polyphenols. Still more particularly, it relates to the stabilization of polypropylene and/or other organic materials normally subject to oxidative deterioration with an effective amount of a hindered polyphenol of the type represented by the Formula I:

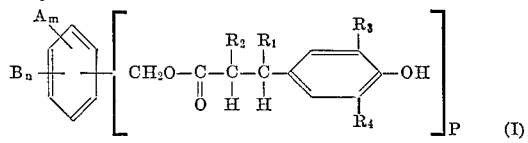

wherein A is hydroxyl, B is hydrogen or lower alkyl, $R_1$ and $R_2$ are hydrogen or lower alkyl, $R_3$ is an alpha-branched alkyl group of 3–18 carbons; $R_4$ is hydrogen or alkyl of 1–18 carbons; $m$ is 0 or 1; $n$ is 0 to 4; $p$ is 2 to 6, and the sum $m+n+p$ is 6.

Simple alkylated phenols, such as 2,6-tert-butyl-4-methyl phenol and 2,4-dimethyl-6-tert-butylphenol, have been found to be useful as stabilizers against oxidative deterioration in a host of substrates, such as rubber, gasoline, polyolefins, and the like. The compounds are, however, quite volatile at the temperatures encountered in use. In certain substrates, such as in polyolefins, other deficiencies become apparent. These include discoloration and extractability. Considerable effort has been devoted to the discovery of new antioxidants, particularly those which are free of these deficiencies.

Many materials of commerce are prone to oxidative deterioration. Polyolefins such as polyethylene and polypropylene and their higher homologues are particularly susceptible to degradation by light, heat, oxygen or their combinations. The effect of this deterioration is to render the polymers brittle, inflexible and discolored. A suitable antioxidant must prevent these effects and not impart undesirable properties to the substrate. Furthermore, the antioxidant should not be extractable from polyolefins, especially polypropylene, when exposed to organic solvents such as perchloroethylene. This is a requirement since one of the major uses of polypropylene is in textile fibers for carpets, draperies, and the like, which are likely to be cleaned with organic solvents. If the antioxidant is thus extracted the substrate will lose some or all of the protection afforded by the antioxidant. The desired combination of good antioxidant protection, non-discoloration and non-extractability has heretofore been elusive. Thus, there is a need for an antioxidant which will meet the above requirements.

The present invention is based on the discovery that a new class of hindered polyphenols, represented by Formula I, is effective for the stabilization of organic substance normally subject to the effects of oxidative deterioration. Moreover, it has been found that these hindered polyphenol antioxidants are non-volatile, nondiscoloring, and extractable to a lesser degree in both water and organic solvents than previously used antioxidants.

The hindered polyphenols of this invention are useful in the stabilization of various organic substrates. Included among the substances so stabilized are poly-α-olefins such as homopolymeric or copolymeric ethylene, propylene or butylene, vinyl resins formed from the polymerization of vinyl monomers or from the copolymerization of vinyl monomers with unsaturated polymerizable compounds, e.g., vinyl esters, α,β-unsaturated acids, α,β-unsaturated esters, α,β-unsaturated ketones, α,β-aldehydes, and unsaturated hydrocarbons such as butadiene, styrene, and the like; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene, polyethylene oxide; and copolymers such as those of high impact polystyrene containing copolymers of butadiene and styrene and those formed by the co-polymerization of acrylonitrile, butadiene and styrene. Other materials which may be effectively stabilized include lubricating oils, animal and vegetable oils; hydrocarbon materials such as gasoline, fuel oil, drying oils, waxes, resins and the like; fatty acids such as soaps; and natural and synthetic rubbers containing olefinic unsaturation.

The stabilizers of this invention are normally employed in an amount of from about 0.01 to about 5% by weight based upon the compound to be stabilized. In polypropylene amounts of from about 0.02 to about 3.0% by weight are advantageous, with from about 0.1 to about 1% by weight, being especially preferred.

Other additives such as thiodipropionic acid esters (LTDP, STDP), as well as lubricants and fillers (TiO₂) may be used in conjunction with the hindered phenols of this invention.

The compounds of this invention may be prepared in several ways: (1) by condensing an appropriate hydroxymethyl benzene (Formula II) with a suitable carboxylic acid (Formula III) in the presence of a catalyst for the condensation; (2) by reacting an appropriate hydroxymethyl benzene (II) with the carboxylic acid (III) in the form of its acid chloride; and (3) by reacting a suitable halomethylbenzene (Formula IV) with the carboxylic acid (III) in the form of its sodium or potassium salt. The latter method is the preferred method.

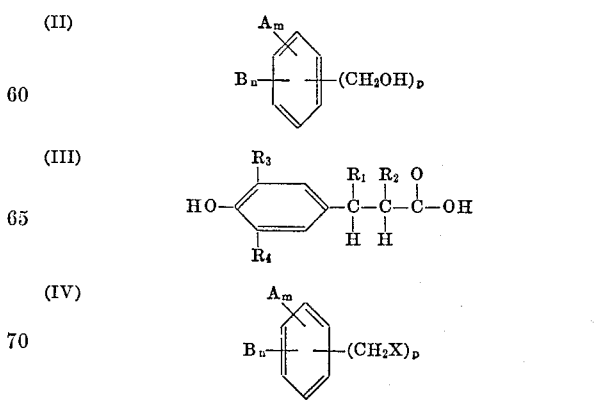

wherein A, B, $R_1$, $R_2$, $R_3$, and $R_4$, $m$, $n$ and $p$ are as defined above and X is a halogen such as chloro, bromo or iodo.

The halomethyl benzenes (IV) can be prepared by reacting the corresponding benzene with formaldehyde and a hydrogen halide, such as hydrogen chloride or hydrogen bromide, according to the procedure described in U.S. 2,945,894; 2,951,100; 2,973,391; and 3,069,480. Alternative procedures involve chlorination of the alkyl group or groups of an appropriate methyl benzene in the presence of suitable catalysts (U.S. 2,926,202) or with chlorine sorbed on zeolite and under reactive conditions (U.S. 2,956,084).

Examples of the halomethyl benzenes (IV) which may be used in the preparation of the hindered phenols of this invention include:

1,3-bis(chloromethyl)benzene;
1,4-bis-(chloromethyl)benzene;
2,4-bis(chloromethyl)toluene;
3,6-bis(chloromethyl)durene;
2,4,6-tris(chloromethyl)-1,3,5-trimethylbenzene;
2,4,6-tris(chloromethyl)-1,3,5-triethylbenzene;
2,4,6-tris-(chloromethyl)-1,3,5-tri-n-propylbenzene;
2,4,5,6-tetrakis(chloromethyl)-1,3-dimethylbenzene;
2,3,4,5,6-pentakis(chloromethyl)-toluene;
1,2,3,4,5,6-hexakis(chloromethyl)benzene, and the like, and the corresponding bromo and iodo derivatives.

The hydroxymethyl benzenes (II) are prepared by the reaction of the appropriately substituted benzene with formaldehyde using a basic catalyst. Certain of the hydroxymethyl benzenes such as the 1,4-dihydroxymethyl benzenes, are available commercially.

The substituted hydroxyphenylpropionic acids (III) which may be reacted (either as the free acid, acid chloride, or alkali metal salt) with the hydroxymethyl or halomethyl benzenes to form the hindered polyphenols of this invention can be made by the reaction of a suitable hindered phenol of the type shown in Formula V with a compound of the type shown in Formula VI followed by saponification. Procedures are used similar to those in U.S. 3,121,732 (Meier et al. to Geigy Chemical Corp.), Feb. 18, 1964, and U.S. 3,247,240 (Meier et al. Geigy Chemical Corp.), Apr. 19, 1966.

(V) 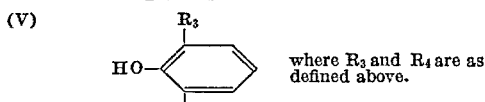

where $R_3$ and $R_4$ are as defined above.

(VI) 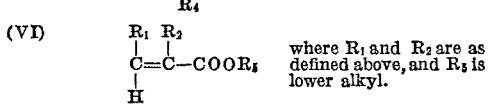

where $R_1$ and $R_2$ are as defined above, and $R_5$ is lower alkyl.

Among the acids of Formula III which may be used are:

3,5-di-tert-butyl-4-hydroxyphenylpropionic acid;
3-tert-butyl-5-methyl-4-hydroxyphenylpropionic acid;
3-(sec-butyl)-5-tertbutyl-4-hydroxyphenylpropionic acid;
3,5-bis(1,1-di-methyl-n-propyl)-4-hydroxyphenylpropionic acid;
3,5-bis(1-methyl-n-nonyl)-4-hydroxyphenylpropionic acid;
3-(1,1,3,3-tetramethyl-n-butyl)-5-methyl-4-hydroxyphenylpropionic acid;
3,5-di-tert-butyl-4-hydroxyphenyl-(3-methyl)propionic acid;
3,5-di-sec.-butyl-4-hydroxyphenylpropionic acid;
3-t.-butyl-5-methyl-4-hydroxyphenylpropionic acid;
3-sec.-butyl-5-t.-butyl-4-hydroxyphenyl-(2,3-dimethyl)propionic acid;
3-n-butyl-5-(1-methyl-n-nonyl)-4-hydroxyphenyl(2-ethyl)propionic acid;
3-n-hexyl-5-(1,1,3,3-tetramethylbutyl)-4-hydroxyphenylpropionic acid;
3-(1-methyl-1-ethylpropyl)-5-n-hexyl-4-hydroxyphenylpropionic acid;
3-(1,1-dimethylbutyl)-5-n-octyl-4-hydroxyphenylpropionic acid;
3-n-octyl-5-(1,1-dimethylpentyl)-4-hydroxyphenylpropionic acid;
3-dodecyl-5-t.-butyl-4-hydroxyphenylpropionic acid;
3-hexadecyl-5-sec.-butyl-4-hydroxyphenylpropionic acid;
3-octadecyl-5-(1,1-dimethylbutyl)-4-hydroxyphenylpropionic acid;
3-(1,1,2-trimethylpropyl)-5-dodecyl-4-hydroxyphenylpropionic acid;
3-(1,1,2,2-tetramethylpropyl)-5-hexadecyl-4-hydroxyphenylpropionic acid;
3-t.-butyl-5-octadecyl-4-hydroxyphenylpropionic acid;
3-methyl-5-t-amyl-4-hydroxyphenylpropionic acid;
3,5-di(1,1,3,3-tetramethylbutyl)-4-hydroxyphenyl-(2-methyl-3-ethyl)propionic acid;
3,5-di(1,1,3-trimethylbutyl)-4-hydroxyphenylpropionic acid;
3,5-di(1,1,2,2-tetramethylpropyl)-4-hydroxyphenyl-(2,3-di-n-propyl)propionic acid;
3-ethyl-5-(1,1,3,3-tetramethylbutyl)-4-hydroxyphenylpropionic acid;
3-t-butyl-5-n-butyl-4-hydroxyphenylpropionic acid;
3-(1-methyl-dodecyl)-5-ethyl-4-hydroxyphenylpropionic acid;
3-n-butyl-5-(1,1-dimethyldodecyl)-4-hydroxyphenylpropionic acid;
3-(1-methylhexadecyl)-5-n-octyl-4-hydroxyphenylpropionic acid;
3-(1,1-dimethylhexadecyl)-5-n-butyl-4-hydroxyphenylpropionic acid;
3,5-di-tert-butyl-4-hydroxyphenyl-(2,3-dimethyl)propionic acid;
3,5-di-tert-butyl-4-hydroxyphenyl-(2-ethyl-3-methyl)propionic acid;
3,5-di-tert-butyl-4-hydroxyphenyl-(2-methyl)propionic acid,
and the like.

The reaction between the halomethylbenzene and the sodium salt of the acid is carried out by heating a solution of the reactants until the reaction is completed. Normally a slight excess of the sodium salt of the acid over that required for reaction is used. A suitable excess is from about 5% to about 10% over the stoichiometric requirement. The presence of an equivalent amount of the free acid may be added if desired, although it is not necessary.

A suitable solvent for conducting the reaction is dimethylformamide. Similar solvents, such as dimethyl acetamide, dimethylsulfoxide, and the like may also be used. When the reaction is run using a hydroxymethylbenzene wherein water is evolved in the reaction, a suitable solvent is toluene or a similar solvent forming azeotropic mixtures with water. When the acid chloride is used it is desirable to use a basic solvent, such as pyridine to tie up the hydrogen chloride evolved.

When the reaction is completed the solvent is removed by evaporation in vacuo and the residue extracted to remove unreacted starting materials and inorganic salts. The residue is usually extracted with ether and washed with dilute sodium hydroxide and with water. The ether is then evaporated, after drying, for example over anhydrous sodium sulfate, and the residue recrystallized using a suitable solvent, such as methanol, ethanol, benzene, methyl cyclohexane, and the like, and dried.

The invention is more fully illustrated by the examples which follow.

EXAMPLE 1

1,4-bis(3,5-di-tert.butyl-4-hydroxyphenylpropionyloxymethyl)benzene

A mixture of 4.35 grams of 1,4-dihydroxymethylbenzene, 19.60 grams of 3,5-di-tert.butyl-4-hydroxyphenylpropionic acid, 0.50 gram of p-toluene sulfonic acid and 200 ml. of toluene was refluxed for 6 hours in a flask equipped with a trap to remove the water-toluene azeotrope formed during the reaction.

The reaction mixture was cooled and extracted with 10% potassium carbonate solution, then with water, and the residue was crystallized from hot ethanol to give 12.84 grams of white solid, M.P. 104° C.

EXAMPLE 2

2,5-bis(3,5-di-tert.butyl-4-hydroxyphenylpropionyloxymethyl)-p-xylene

A mixture of 2.92 grams of 2,5-dibromomethyl-p-xylene, 6.4 grams of 3,5-di-tert.butyl-4-hydroxyphenylpropionic acid, sodium salt, and 6.4 grams of 3,5-di-tert.-butyl-4-hydroxyphenylpropionic acid (optional) in 8 ml. of dimethylformamide was heated to 150° C. and held for ½ hour. The dimethylformamide was then evaporated off under vacuum and the residue extracted with ether. The combined extract was washed with dilute sodium hydroxide solution, dried over anhydrous sodium sulfate and evaporated under vacuum. The residue was crystallized from methyl cyclohexane to give white needles (5.5 grams) M.P. 129–130° C. (Alternatively, the reaction mixture was cooled to about 50° C. and poured into rapidly stirred water. This was subsequently extracted with ether and worked up as above.)

EXAMPLE 3

2,5-bis(3,5-di-tert.butyl-4-hydroxyphenylpropionyloxymethyl)durene

In a manner similar to Example 2, 3.2 grams of 2,5-dibromomethyldurene, 6.4 grams of 3,5-di-tert.butyl-4-hydroxyphenylpropionic acid sodium salt and 6.4 grams of the corresponding free acid in 10 ml. of dimethylformamide gave 4.5 grams of 2,5-bis(3,5-di-tert.butyl-4-hydroxyphenylpropionyloxymethyl)durene, M.P. 212–214° C.

EXAMPLE 4

2,4,6-tris(3,5-di-tert.butyl-4-hydroxyphenylpropionyloxymethyl)mesitylene

In a manner similar to Example 2, 4.1 grams of 2,4,6-tris-(bromomethyl)mesitylene, and 9.3 grams of the sodium salt of the acid in 6 ml. of dimethylformamide gave 6.7 grams of 2,4,6-tris(3,5-di-tert.butyl-4-hydroxyphenylpropionyloxymethyl)mesitylene, M.P. 125° C. (from methanol).

EXAMPLE 5

1,2,4,5-tetrakis(3,5-di-tert.butyl-4-hydroxyphenylpropionyloxymethyl)benzene

In a manner similar to Example 2, 4.15 grams of 1,2,4,5-tetra(bromomethyl)benzene and 12.0 grams of the sodium salt of the acid in 10 ml. of dimethylformamide gave 1,2,4,5 - tetrakis(3,5-di-tert.butyl-4-hydroxyphenylpropionyloxymethyl)benzene, M.P. 153–154° C. (from methylcyclohexane).

EXAMPLE 6

Hexakis(3,5-di-tert.butyl-4-hydroxyphenylpropionyloxymethyl)benzene

In a manner similar to Example 2, 3.12 grams of hexa-(bromomethyl)benzene and 9.0 grams of the sodium salt of the acid in 25 ml. of dimethylformamide gave about 4 grams of hexakis(3,5 - di - tert.butyl-4-hydroxyphenylpropionyloxymethyl)benzene, M.P. 85° C. (from hexane).

EXAMPLE 7

2,6-bis(3,5-di-tert.butyl-4-hydroxyphenylpropionyloxymethyl)-p-cresol

A mixture of 0.095 mole of 3(3',5'-di-tert.butyl-4'-hydroxyphenyl)propionyl chloride and 0.047 mole of 2,6-dimethylol-p-cresol were reacted in 75 ml. of pyridine at 0–25° C. The resulting gum, obtained after drowning the mixture in 5 N hydrochloric acid was recrystallized from heptane, washed with warm 5% sodium bicarbonate, and eluted through activated alumina using benzene. A tan solid, M.P. 65–67° C. was obtained.

EXAMPLE 8

The hindered polyphenols from Examples 1–7 were incorporated into unstabilized polypropylene (AviSun Corp.) at a concentration of 0.2 wt. percent by dry blending, followed by milling at 320–250° F. and subsequent compression molding at 350° F.

The compression molded films (15–20 mils thickness) were oven aged in a forced draft oven at 140° C. The effectiveness of the antioxidants was measured in terms of hours to polymer embrittlement. In addition, the polymer samples containing these antioxidants were also exposed to the Fade-Ometer in order to determine their effect on the light stability of polypropylene. The data are shown in Table I.

TABLE I

| 0.2% additive | Oven-aging 140° C. brittle point (hrs.) | Fade-Ometer exposure brittle point (hrs.) |
|---|---|---|
| Control | 3–4 | 0–100 |
| Compound of Ex. 1 | 1,120 | 300–400 |
| Compound of Ex. 2 | *1,160 | |
| Compound of Ex. 3 | 1,240 | 400–500 |
| Compound of Ex. 4 | 1,350 | 200–300 |
| Compound of Ex. 5 | 1,430 | 100–200 |
| Compound of Ex. 6 | 1,270 | 200–300 |
| Compound of Ex. 7 | 1,130 | 300–400 |

*Aging at 150° C.

Similar film samples containing the above antioxidants were immersed in 250 ml. distilled water and refluxed for 16 hours. After this treatment, the films were then placed in a forced draft oven at 150° C. and the time in hours to embrittlement noted. A high brittle point after this treatment indicates a low degree of extractability. Data are shown in Table II.

TABLE II

| 0.2% additive: | Oven-aging 150° C., brittle point (hrs.) |
|---|---|
| Compound of Ex. 2 | 430 |
| Compound of Ex. 3 | 680 |
| Compound of Ex. 4 | 760 |
| Compound of Ex. 5 | 950 |
| Compound of Ex. 6 | 1160 |

Similarly, film samples containing the above antioxidants were tested for extraction resistance to dry cleaning solvents such as perchloroethylene. Two cycles of the AATCC-85 test method was used. Each cycle represents a 30 minute extraction in perchloroethylene at 114° F. The films were oven-aged, after extraction, at 150° C. and embrittlement noted. The results of this test are shown in Table III. It should be noted that certain members of this class are extremely resistant to extraction by organic solvents.

TABLE III

Evaluation in polypropylene—Oven-aging after perchloroethylene extraction

| 0.2% additive: | Oven-aging, 150° C. (hrs.) |
|---|---|
| Compound of Ex. 1 | 130 |
| Compound of Ex. 2 | 110 |
| Compound of Ex. 3 | 75 |
| Compound of Ex. 4 | 50 |
| Compound of Ex. 5 | 580 |
| Compound of Ex. 6 | 780 |
| Compound of Ex. 7 | 130 |

EXAMPLE 9

In a manner similar to Example 8 the antioxidant of Example 4 was incorporated into ABS polymer (Marbon Corp.) by milling at 350° F. in the following formulation:

0.5% antioxidant
1.0% zinc stearate (lubricant)
5.0% titanium dioxide

The material was compression molded at 350° F., 24 tons pressure, to give 50 mil plaques. The plaques were oven-aged in a forced draft oven at 150° C., and the effectiveness of the antioxidant was measured in terms of discoloration and embrittlement. Table IV shows that the polymer sample containing 2,4,6-tris(3,5-di-t-butyl-4-hydroxyphenylpropionyloxymethyl)mesitylene, resisted embrittlement to a greater extent and discolored to a lesser extent on aging, than the control.

TABLE IV

| 0.5% additive | Oven-aging, 150° C. | | | |
|---|---|---|---|---|
| | Brittle point (hrs.) | Yellow Index* | | |
| | | 6 hours | 7 hours | 14 hours |
| Control | 6-7 | 10 | 13 | 25 |
| Compound of Ex. 4 | 26 | 6 | 7 | 9 |

*Yellow Index=70(1-Blue/Green); blue, green are reflectance readings on a "Colormaster" Differential Colorimeter.

EXAMPLE 10

In a manner similar to Example 8 the antioxidants were incorporated into unstabilized nylon 6 (Foster Grant) by dry blending. Films 3–5 mils in thickness were prepared by compression molding at 520° C., 16 tons pressure. The films were aged in a forced-draft oven at 150° C. and the time (in hours) to embrittlement measured. The data in Table V show that 2,4,6-tris(3,5-di-t-butyl-4-hydroxyphenylpropionyloxymethyl)mesitylene is very effective in preventing nylon 6 embrittlement.

TABLE V

| 0.5% additive: | Oven aging at 150° C. to brittle point (hrs.) |
|---|---|
| Control | 6 |
| Compound of Ex. 4 | 107–117 |
| Compound of Ex. 5 | 25 |
| Compound of Ex. 6 | 25 |

Similarly, incorporation of the compounds of Examples 1 to 7 at a 0.5 wt. percent concentration, in oleaginous materials (animal, mineral and vegetable in origin), waxes and elastomers (natural rubber and a butadiene rubber) resulted in a very marked improvement in the oxidation stability of the substrates.

EXAMPLE 11

Evaluation of hexakis(3,5-di-tert.-butyl-4-hydroxyphenylpropionyloxymethyl)benzene in high density polypropylene & ABS polymers The compound of Example 6 was incorporated into high density polyethylene & ABS at a concentration of 0.01% by milling and films (50 mils) were prepared by compression molding, and exposed in a forced draft oven at 120° C. The effectiveness of the antioxidant was measured in terms of discoloration on aging, as well as by the time to embrittlement. The data are shown below.

TABLE VI

Oven-aging at 120° C. of high density polypropylene

| No. | Sample | Time to brittle point (hrs.) | Yellow Index | | |
|---|---|---|---|---|---|
| | | | 0 hrs. | 300 hrs. | 600 hrs. |
| 1 | Control | 560–580 | 2.1 | 4.2 | 5.7 |
| 2 | Compound of Ex. 6 | 790–800 | 1.2 | 3.4 | 3.7 |

TABLE VII

Oven-aging at 150° C. of ABS polymer*

| No. | Sample | Time to brittle point (hrs.) | Initial YI | Δ(YI) at: | |
|---|---|---|---|---|---|
| | | | | 5 hrs. | 16 hrs. |
| 1 | Control (no additive) | 5 | 13 | 28 | 45 |
| 2 | Compound of Ex. 2 | 721 | 11 | 9 | 15 |
| 3 | Compound of Ex. 6 | 721 | 12 | 7 | 14 |

*Yellow Index measured by ASTM D-1925 using Hunter Color Difference Meter.

EXAMPLE 12

Following the evaluation procedure given in Example 11, the antioxidants of Examples 1–6 were evaluated for effectiveness in polyamide compositions as represented by nylon 6.

TABLE VIII

Oven-aging at 150° C. of nylon 6

| No. | Sample | Time to brittle point (hrs.) |
|---|---|---|
| 1 | Control | 6 |
| 2 | Compound of Ex. 6 | 25, 23 |
| 3 | Compound of Ex. 5 | 24 |
| 4 | Compound of Ex. 4 | 117, 107 |
| 5 | Compound of Ex. 3 | 76 |
| 6 | Compound of Ex. 2 | 76 |
| 7 | Compound of Ex. 1 | 76 |

We claim:
1. A hindered polyphenol represented by the formula:

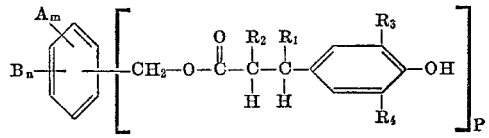

wherein A is hydrogen; B is hydrogen or lower alkyl; $R_1$ and $R_2$ are hydrogen or lower alkyl; $R_3$ is an alpha-branched alkyl group of 3–18 carbons; $R_4$ is hydrogen or alkyl of 1–18 carbons; $m$ is 0 or 1; $n$ is 0 to 4; $p$ is 2 to 6, and the sum of $m+n+p$ is 6.

2. The polyphenol of claim 1 which is 2,4,6-tris(3,5-di - tert - butyl - 4 - hydroxyphenylpropionyloxymethyl) mesitylene.

3. The polyphenol of claim 1 which is 1,2,4,5-tetrakis (3,5-di-tert - butyl - 4 - hydroxyphenylpropionyloxymethyl)benzene.

4. The polyphenol of claim 1 which is hexakis(3,5-di-tert-butyl-4-hydroxyphenylpropionyloxymethyl)benzene.

References Cited

UNITED STATES PATENTS 3,285,855  11/1966  Dexter et al. _____ 260—473 S
3,422,059  1/1969  Taylor et al. _____ 260—473 S LORRAINE A. WEINBERGER, Primary Examiner J. F. TERAPANE, Assistant Examiner U.S. Cl. X.R.

44—70; 99—163; 260—45.85, 810, 618, 651, 619, 624, 626